US007814496B2

(12) United States Patent
Panesar et al.

(10) Patent No.: US 7,814,496 B2
(45) Date of Patent: Oct. 12, 2010

(54) METHOD AND SYSTEM FOR REPLICATING SCHEDULES WITH REGARD TO A HOST CONTROLLER FOR VIRTUALIZATION

(75) Inventors: Kiran Panesar, Hillsboro, OR (US); Philip Lantz, Cornelius, OR (US); Rajesh Madukkarumukumana, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 1454 days.

(21) Appl. No.: 11/207,495

(22) Filed: Aug. 19, 2005

(65) Prior Publication Data

US 2007/0044100 A1    Feb. 22, 2007

(51) Int. Cl.
*G06F 9/455*    (2006.01)
(52) U.S. Cl. .......................... 718/108; 718/1
(58) Field of Classification Search ............... 718/1, 718/108
See application file for complete search history.

(56) References Cited

U.S. PATENT DOCUMENTS

| | | | | |
|---|---|---|---|---|
| 4,812,967 A | * | 3/1989 | Hirosawa et al. ............. 710/269 |
| 4,860,190 A | * | 8/1989 | Kaneda et al. ................. 710/49 |
| 5,101,346 A | * | 3/1992 | Ohtsuki ........................ 718/100 |
| 5,970,242 A | * | 10/1999 | O'Connor et al. ............ 717/100 |
| 7,082,598 B1 | * | 7/2006 | Le et al. ....................... 717/127 |
| 7,400,648 B2 | * | 7/2008 | Cromer et al. ............... 370/466 |
| 7,458,075 B2 | * | 11/2008 | Keys ............................... 718/1 |
| 2002/0143842 A1 | * | 10/2002 | Cota-Robles et al. .......... 709/1 |
| 2002/0199053 A1 | * | 12/2002 | Kondoh ....................... 710/310 |

OTHER PUBLICATIONS

U.S. Appl. No. 11/207,544, filed Aug. 19, 2005, Panesar.
U.S. Appl. No. 11/207,545, filed Aug. 19, 2005, Panesar.

* cited by examiner

*Primary Examiner*—Meng-Ai An
*Assistant Examiner*—Blake Kumabe
(74) *Attorney, Agent, or Firm*—Trop, Pruner & Hu, P.C.

(57) ABSTRACT

According to one embodiment, USB device virtualization can be improved by giving virtual machines (VMs) direct access to USB devices with a combined hardware and software solution. One aspect is directed to including providing a set of PCI configuration registers and operational registers for each VM, providing an interrupt request line for each VM, and using a new schedule traversal algorithm for multiple schedules, including a fairness algorithm that prevents starvation of any VM's bulk traffic.

11 Claims, 7 Drawing Sheets

PRIOR ART

PRIOR ART

```
While (1)
  // every Frame,

// Periodic: for each interface, execute the isoch and interrupt TDs
    If (Periodic Schedule Enabled)
       Execute USBBase.PeriodicListBase[FrIndex]
    Endif // Asynchronous: if time left in frame, execute the control and bulk TDs
    If (Anychronous Schedule Enabled)
       Execute USBBase.AsyncListAddr
    Endif // Increment and roll over Frame list index
    FrIndex = (FrIndex + 1) % FrameListSize;

EndWhile
```

FIG. 6

```
While (1)
  // every Frame,

// Periodic: for each interface, execute the isoch and interrupt TDs
  For (Intf=0; Intf < MAXInterfaces; Intf++)
     If (Interface[Intf].Periodic Schedule Enabled)
        Execute USBBase[Intf].PeriodicListBase[FrIndex[Intf]]
     EndIf // each schedule maintains its own FrIndex
     // Increment and roll over Frame list index
     FrIndex[Intf] = (FrIndex[Intf] + 1) % (FrameListSize [Intf]);

EndFor

// Asynchronous: if time left in frame, execute the bulk and control TDs
  For each interface, starting from StartIntf
     If (Interface[Intf].Anychronous Schedule Enabled)
        Execute USBBase[Intf].AsyncListAddr
        // save QH in USBBase[Intf].AsynchListAddr (per VM fairness)
     EndIf Intf ++

EndFor

// round robin access for bulk transfers (inter VM fairness)
  StartIntf = Intf+1;

EndWhile
```

FIG. 7

METHOD AND SYSTEM FOR REPLICATING SCHEDULES WITH REGARD TO A HOST CONTROLLER FOR VIRTUALIZATION

BACKGROUND OF THE INVENTION

1. Field of the Invention

The present invention relates to virtualization, specifically, replicating schedules for Universal Serial Bus (USB) devices for virtualization.

2. Description of the Related Art

Figure 1:
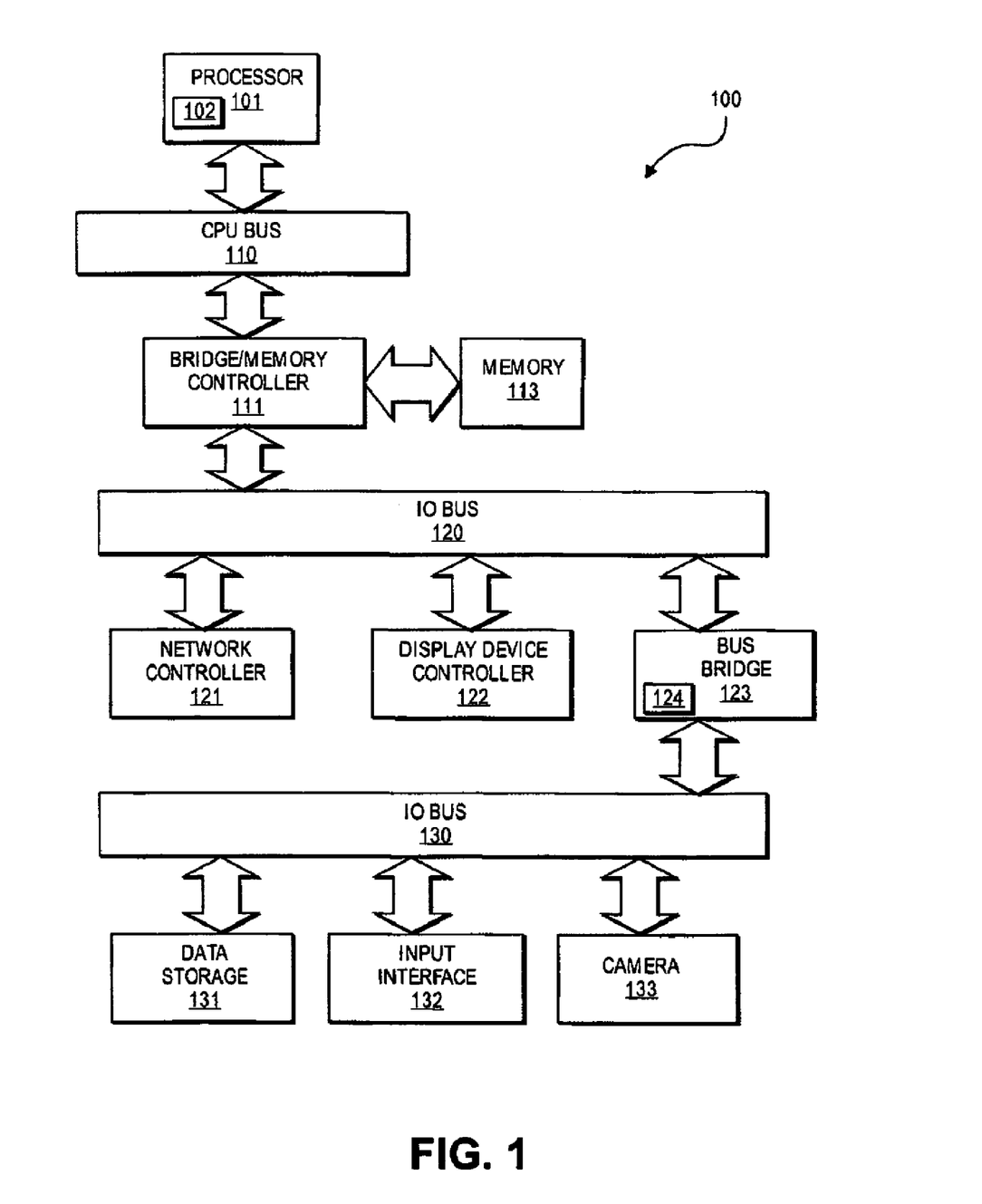
FIG. 1 is a computer system as utilized by one embodiment.

Virtualization is a technique in which a computer system is partitioned into multiple isolated virtual machines (VMs), each of which appears to the software within it to be a complete computer system. The software running within each VM—including the operating system in the VM—may be unaware of any of the other VMs, or even that the computer system is partitioned. The virtual machine monitor (VMM) is responsible for providing the environment in which each VM runs and maintaining isolation between the VMs. FIG. 1 shows an example of a typical virtualized computer system.

Each virtual machine has access to a set of devices, which may be virtual devices or physical devices. These devices include controllers for secondary busses. The VMM controls which physical devices/controllers are assigned to each VM, and also implements the virtual devices are visible to VMs. If a physical device is exclusively assigned to a single virtual machine, it is not available to the other virtual machines. In current practice, if a device needs to be shared by more than one VM, the VMM typically implements a virtual device for each VM, and arbitrates access of the virtual devices to the physical device. The implementation of the virtual devices and the arbitration of access to the physical device adds overhead and reduces the performance of both the computer system and the device. Also, the virtual device typically defines a different more limited interface and functionality than the physical device.

USB 2.0 (Universal Serial Bus Revision 2.0 Specification, published 2002) is an external bus that supports data rates of up to 480 Mbps. USB 2.0 is an extension of USB 1.1 (Universal Serial Bus Revision 1.1 Specification, published 1996) and is fully compatible with USB 1.1. Current virtualization software solutions provide limited support for USB 2.0. For example, existing virtualization software solutions do not support isochronous devices nor do they support more than two devices on USB 2.0 per VM.

In the case of USB, the VMM may wish to assign individual USB devices to specific VMs, to avoid the problems associated with virtualizing the USB devices. However, the USB host controller is used to communicate with all connected USB devices, so it cannot be assigned to any single VM. The host controller must be virtualized in a way that allows each VM to use it to communicate with the USB devices assigned to that VM.

However, a problem arises for USB virtualization. Each virtual machine (VM) has its own USB schedule. In contrast, the USB controller adheres to a single schedule. Therefore, the problem arises of dealing with multiple schedules of the respective VMs. Present commercial software solutions offer limited or no support for USB Host Controller virtualization. For example, some solutions present UHCI (USB 1.1) controllers to guest operating systems (with no EHCI virtualization) and only allow two devices per virtual machine. Thus, current products do not implement hub virtualization and do not allow for isochronous devices. Further, current solutions are software only solutions.

Figure 2:
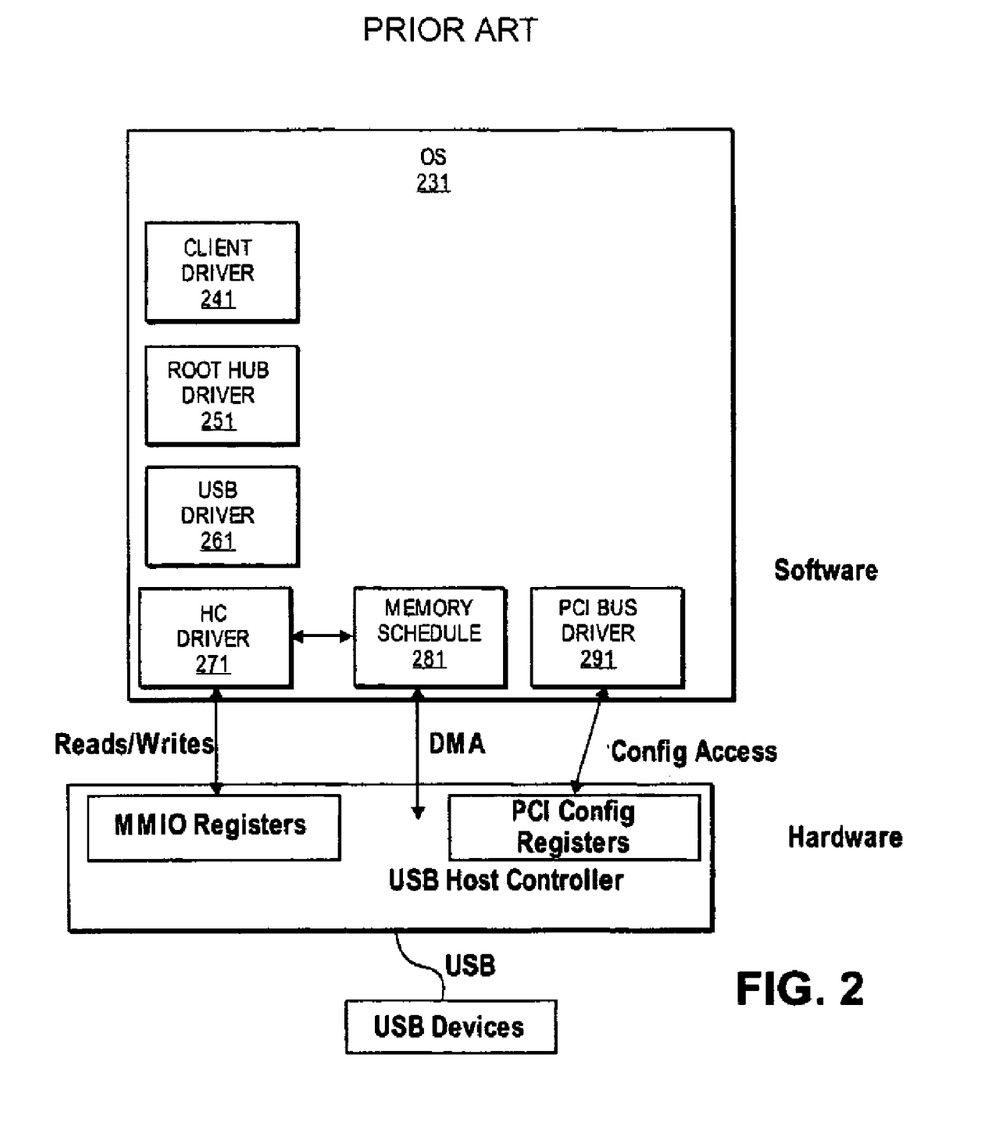
FIG. 2 is shows the details of USB host controller and the associated software drivers and is prior art.

FIG. 2 is prior art and shows the software stack, the USB host controller, and their interactions. Specifically, FIG. 2 shows that the software includes an operating system (OS) 231 which includes various components including drivers and schedulers, specifically a client driver 241, a root hub driver 251, a USB driver 261, a host controller (HC) driver 271, and a peripheral component interconnect (PCI) bus driver 291. In addition, a memory schedule 281 is present.

BRIEF DESCRIPTION OF THE DRAWINGS

Subject matter is particularly pointed out and distinctly claimed in the concluding portion of the specification. The claimed subject matter, however, both as to organization and method of operation, together with objects, features, and advantages thereof, may best be understood by reference to the following detailed description when read with the accompanying drawings in which:

Table 2 is a set of operational registers as utilized by one embodiment of the claimed subject matter.

DETAILED DESCRIPTION OF THE INVENTION

In the following description, for purposes of explanation, numerous details are set forth in order to provide a thorough understanding of the present invention. However, it will be apparent to one skilled in the art that these specific details are not required in order to practice the present invention.

The current application may utilize embodiments depicted in related applications P21821 and P21820, filed on the same date. P21820 is entitled "Method and System for Managing Bandwidth in a Virtualized System" with inventors: Kiran Panesar, Philip Lantz, Michael Goldsmith, and Sanjay Kumar. P21821 is entitled "A Method and System for Device Address Translation for Virtualization" with inventors: Kiran Panesar and Philip Lantz. Another related application P21467 is titled "Method and Apparatus for Supporting Universal Serial Bus Devices in a Virtualized Environment" with inventors Kiran Panesar, Sanjay Kumar, Abdul R Ismail and Philip Lantz. P21467 describes software techniques for assigning USB devices to VMs.

FIG. 1 is a block diagram of an exemplary computer system 100 according to an embodiment of the present invention. The computer system 100 includes a processor 101 that processes data signals. The processor 101 may be a complex instruction set computer microprocessor, a reduced instruction set computing microprocessor, a very long instruction word microprocessor, a processor implementing a combination of instruction sets, or other processor device. FIG. 1 shows the computer system 100 with a single processor. However, it is understood that the computer system 100 may operate with multiple processors. Additionally, each of the one or more processors may support one or more hardware threads. The processor 101 is coupled to a CPU bus 110 that transmits data signals between processor 101 and other components in the computer system 100.

The computer system 100 includes a memory 113. The memory 113 may be a dynamic random access memory device, a static random access memory device, read-only memory, and/or other memory device. The memory 113 may store instructions and code represented by data signals that may be executed by the processor 101. A cache memory 102 may reside inside processor 101 that stores data signals stored in memory 113. The cache 102 speeds access to memory by the processor 101 by taking advantage of its locality of access. In an alternate embodiment of the computer system 100, the cache resides external to the processor 101. A bridge memory controller 111 is coupled to the CPU bus 110 and the memory 113. The bridge memory controller 111 directs data signals between the processor 101, the memory 113, and other components in the computer system 100 and bridges the data signals between the CPU bus 110, the memory 113, and IO bus 120.

The IO bus 120 may be a single bus or a combination of multiple buses. The IO bus 120 provides communication links between components in the computer system 100. A network controller 121 is coupled to the IO bus 120. The network controller 121 may link the computer system 100 to a network of computers (not shown) and supports communication among the machines. A display device controller 122 is coupled to a first IO bus 120. The display device controller 122 allows coupling of a display device (not shown) to the computer system 100 and acts as an interface between the display device and the computer system 100. Alternatively, the display device controller 122 may be connected directly to bridge 111.

A second IO bus 130 may be a single bus or a combination of multiple buses. IO bus 130 provides communication links between components in the computer system 100. A data storage device 131 is coupled to the IO bus 130. The data storage device 131 may be a hard disk drive, a floppy disk drive, a CD-ROM device, a flash memory device or other mass storage device. An input interface 132 is coupled to the IO bus 130. The input interface 132 may be, for example, a keyboard and/or mouse controller or other input interface. The input interface 132 may be a dedicated device or can reside in another device such as a bus controller or other controller. The input interface 132 allows coupling of an input device to the computer system 100 and transmits data signals from an input device to the computer system 100. A camera 133 is coupled to IO bus 130. The camera 133 operates to capture images that may be displayed on a display device or stored in memory 113.

A bus bridge 123 couples IO bus 120 to IO bus 130. The bus bridge 123 operates to buffer and bridge data signals between IO bus 120 and IO bus 130. According to an embodiment of the computer system 100, IO bus 130 is a USB 2.0 bus and the bus bridge 123 includes a USB host controller 124. The host controller 124 controls IO bus 130 by executing a schedule of tasks provided. The host controller 124 also sends out packets on IO bus 130, looks for status, and provides a register interface to software.

Figure 3:
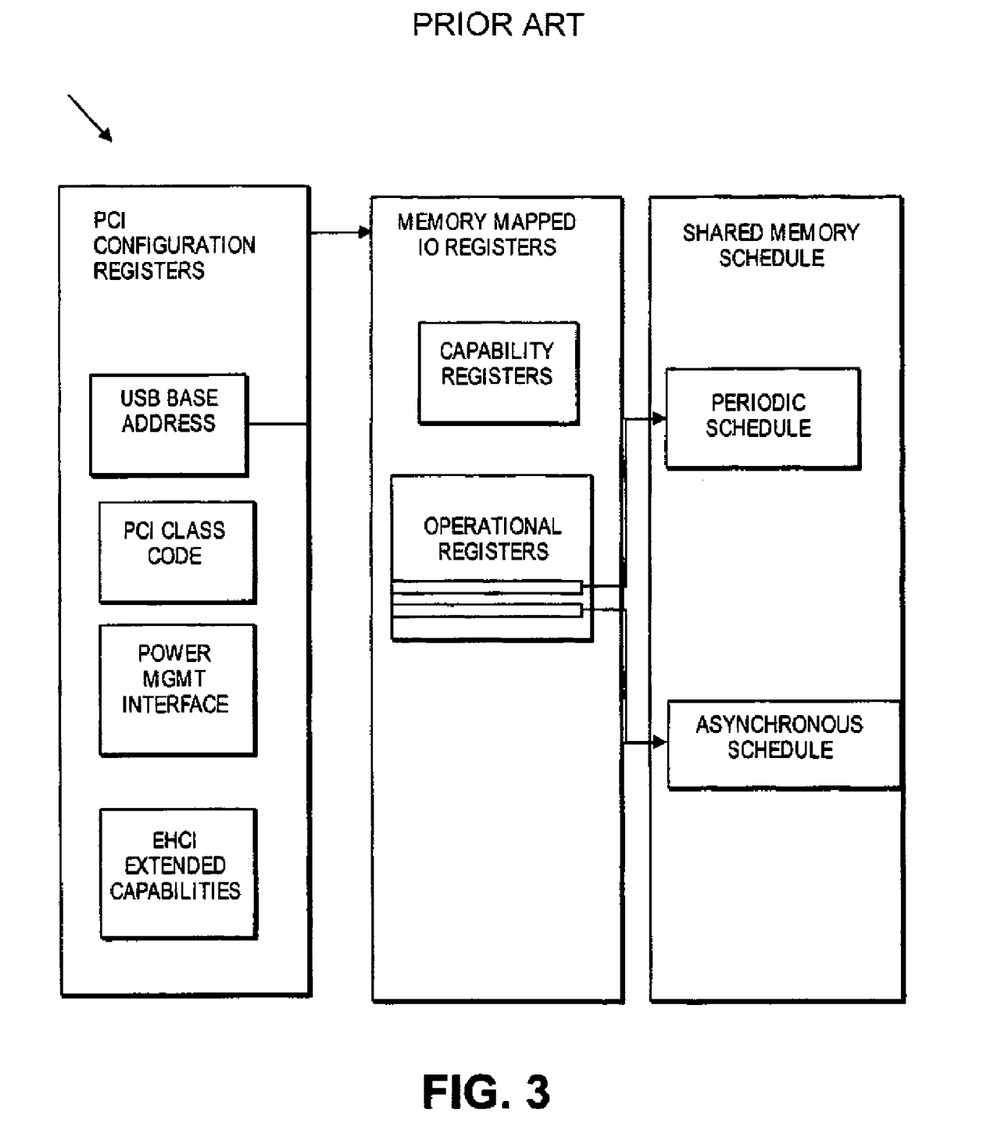
FIG. 3 shows the current EHCI interface as described in USB 2.0 specifications, and is prior art.

FIG. 3 shows a block diagram that illustrates the architecture of an Enhanced Host Controller Interface (EHCI). The interface includes two sets of registers, and a shared memory schedule. The two sets of registers are PCI configuration registers, and memory mapped I/O registers. The PCI configuration registers may help the OS in discovering the EHCI. They may contain a register called USB Base address that points to memory mapped IO registers. The memory mapped IO registers are divided into two sets of registers, a set of capability registers, and second a set of operational registers. The capability registers contain the current capabilities of the EHC. The operational registers may include registers for the periodic schedule and for the asynchronous schedule.

The shared memory schedule may include one or more transfer descriptors (TDs). TDs are IO descriptors that may include an address in memory in which to start a transfer, a size of the memory to transfer, and a destination USB device and endpoint address. The schedule may also include one or more queue heads (QHs). QHs are used to associate groups of TDs together. According to an embodiment of the present invention, the host controller driver 271 generates a schedule for the host controller that includes both isochronous (periodic) data and asynchronous (bulk) data. The asynchronous data may be scheduled to be executed only after the isochronous data has been executed for a frame.

Figure 4:
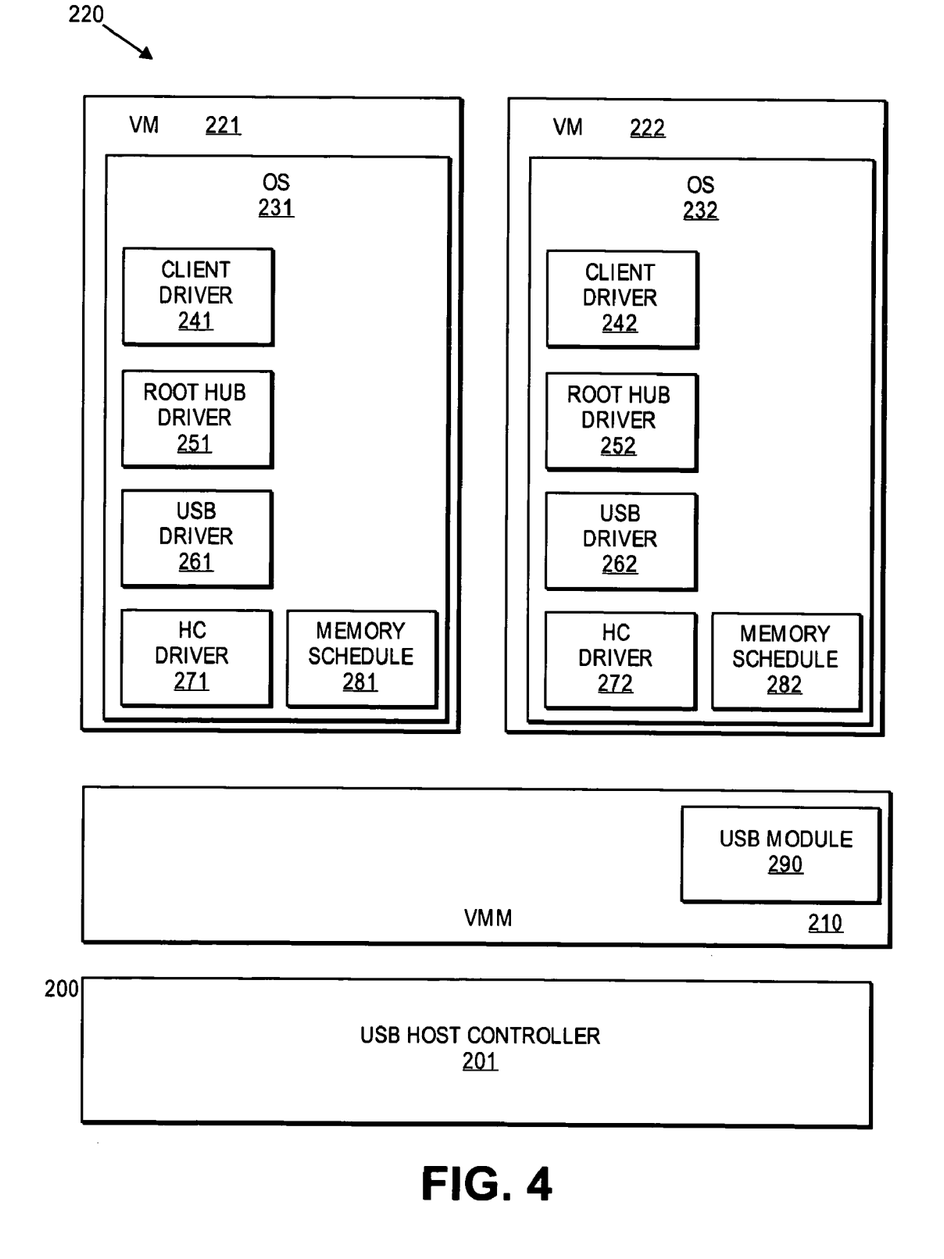
FIG. 4 shows a virtualized computer system as utilized by one embodiment of the claimed subject matter.

FIG. 4 is a block diagram that illustrates a virtualized environment 200 according to a first embodiment of the present invention. The virtualized environment 200 includes a VMM 210. The VMM 210 interfaces a physical machine. The physical machine may include components of a computer system such as, for example, one or more processors, a memory, buses, a host controller, and various IO devices. According to an embodiment of the present invention, the physical machine may be implemented by the computer system 100 shown in FIG. 1 or a computer system having components similar to those shown in FIG. 1. The VMM 210 facilitates one or more VMs 220 to be run. According to an embodiment of the present invention, the VMM 210 may be a sequence of instructions stored in a memory of a computer system. The VMM 210 manages and mediates computer system resources in the physical machine between the VMs 220 and allows the isolation of or data sharing between VMs 220. The VMM 210 achieves this isolation or sharing by virtualizing resources in the physical machine and exporting a virtual hardware interface (i.e., a VM) that could reflect an underlying architecture of the physical machine, a variant of the physical machine, or an entirely different physical machine.

The virtualized environment 200 includes one or more VMs 221-222 (collectively shown as 220). According to an embodiment of the present invention, a VM may be described as an isolated model of a machine including, but not limited to, a replica of the physical machine, a subset of the physical machine, or model of an entirely different machine. A VM may include the resources of the computer system in the physical machine, a subset of the resources of the computer system in the physical machine, or entirely virtual resources not found in the physical machine.

According to an embodiment of the present invention, the VMM 210 has control of the physical machine and creates VMs 220, each of which behaves like a physical machine that can run its own operating system (OS). VMs 221-222 may run operating systems (guest operating systems) 231 and 232 respectively where the operating systems 231 and 232 may be unique to one another. As seen, each such OS may include a corresponding client driver 241 and 242, a root hub driver 251 and 252, a USB driver 261 and 262, a HC driver 271 and 272, and a memory schedule 281 and 282. To maximize performance, the VMM 210 allows a VM to execute directly on the resources of the computer system in the physical machine when possible, and VMM 210 is shown to include a USB module 290. VMM 210 may further communicate with a USB host controller 201. The VMM 210 may take control, however, whenever a VM attempts to perform an operation that may affect the operation of other VMs, the VMM 210 or of the operation of resources in the physical machine. The VMM 210 may emulate the operation and may return control to the VM when the operation is completed. One or more applications (guest applications) may be run on each of the VMs 221 and 222.

Figure 5:
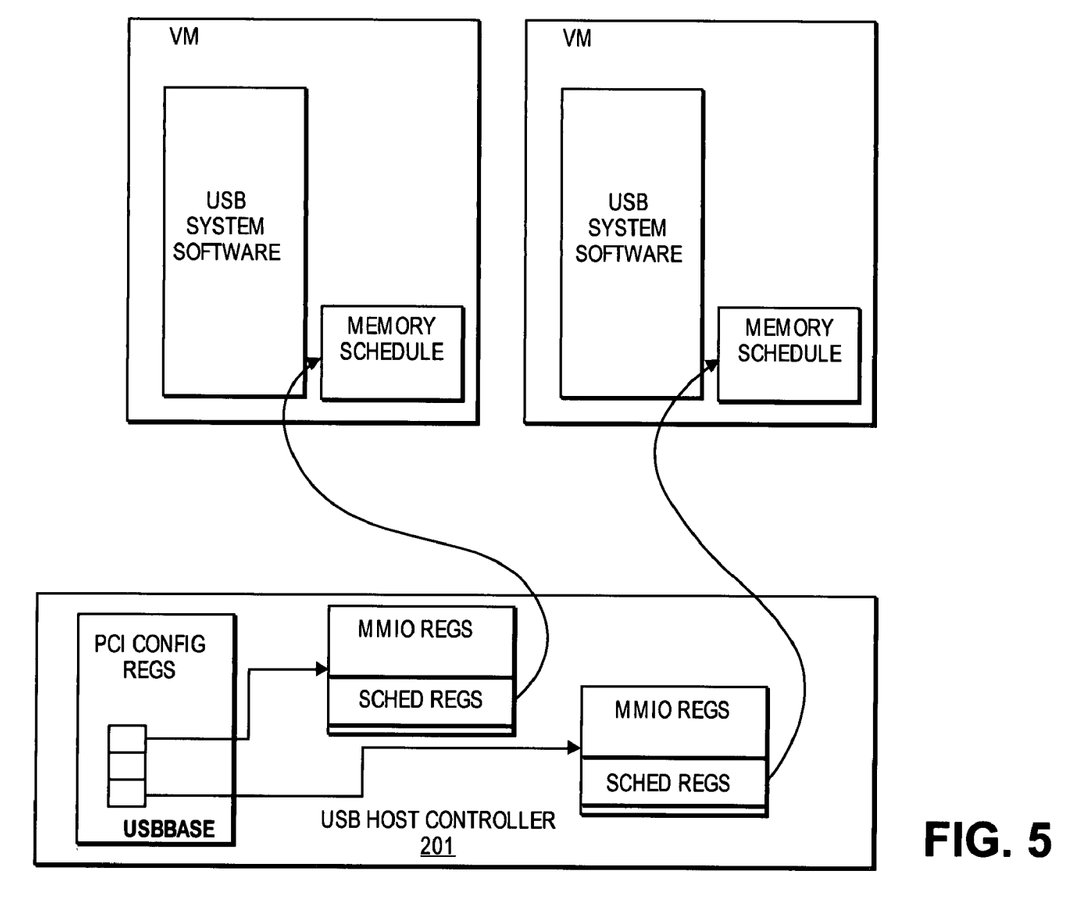
FIG. 5 shows one method of replicating the USB interface by replicating the PCI configuration registers in the EHCI interface.

FIG. 5 illustrates a solution to the problem of dealing with multiple schedules of the respective VMs when virtualizing a USB controller. A set of registers within the USB host controller 201 is replicated for each VM. The set of registers that is replicated may include a USBBase register, an asynchronous list base pointer, a periodic list base pointer, and other PCI configuration registers and operational registers. Each VM is assigned one set of registers by the VMM. When the VM accesses a register in the USB controller, the access is directed to the proper register within the set of registers assigned to that VM. The registers are discussed in further detail in connection with the Tables.

From the perspective of each VM, it looks like it has a private set of USB registers. The software in the VM uses those registers to set up the USB schedule in memory. In one embodiment of this invention, accesses by the VM to the PCI configuration space registers are trapped and virtualized by the VMM. The VMM module traps accesses to the virtual registers, and propagates the access to the HC register set. For example, when a VM accesses its USBBase register, the VMM propagates the access to the proper USBBase register in the host controller. For example, when HC driver 272 in VM 222 reads USBBase, it may actually be using register USBBase[2].

Table 1 describes the new PCI configuration space registers in the host controller, according to one embodiment of the claimed subject matter. The new registers may be located in extended configuration space so that they are accessible only by the VMM. For each register, Table 1 lists the offset, a mnemonic, a general description, the type of access allowed and general comments.

ment of the claimed subject matter. For each register, Table 2 lists the offset and a description of the register

TABLE 2

USB operational registers (for EHCI), replicated for each VM

| Offset REGISTER | Description |
|---|---|
| 00h USBCMD | USB Command |
| 04h USBSTS | USB Status |
| 08h USBINTR | USB Interrupt Enable |
| 0Ch FRINDEX | USB Frame Index |
| 10h CTRLDSSEGMENT | 4G Segment Selector |
| 14h PERIODICLISTBASE | Frame List Base Address |
| 18h ASYNCLISTADDR | Next Asynchronous List Address |
| 1C-3Fh Core | Reserved |
| 40h CONFIGFLAG Aux | Configured Flag Register |
| 44h PORTSC(1-N_PORTS) | Port Status/Control Aux |

Figure 6:
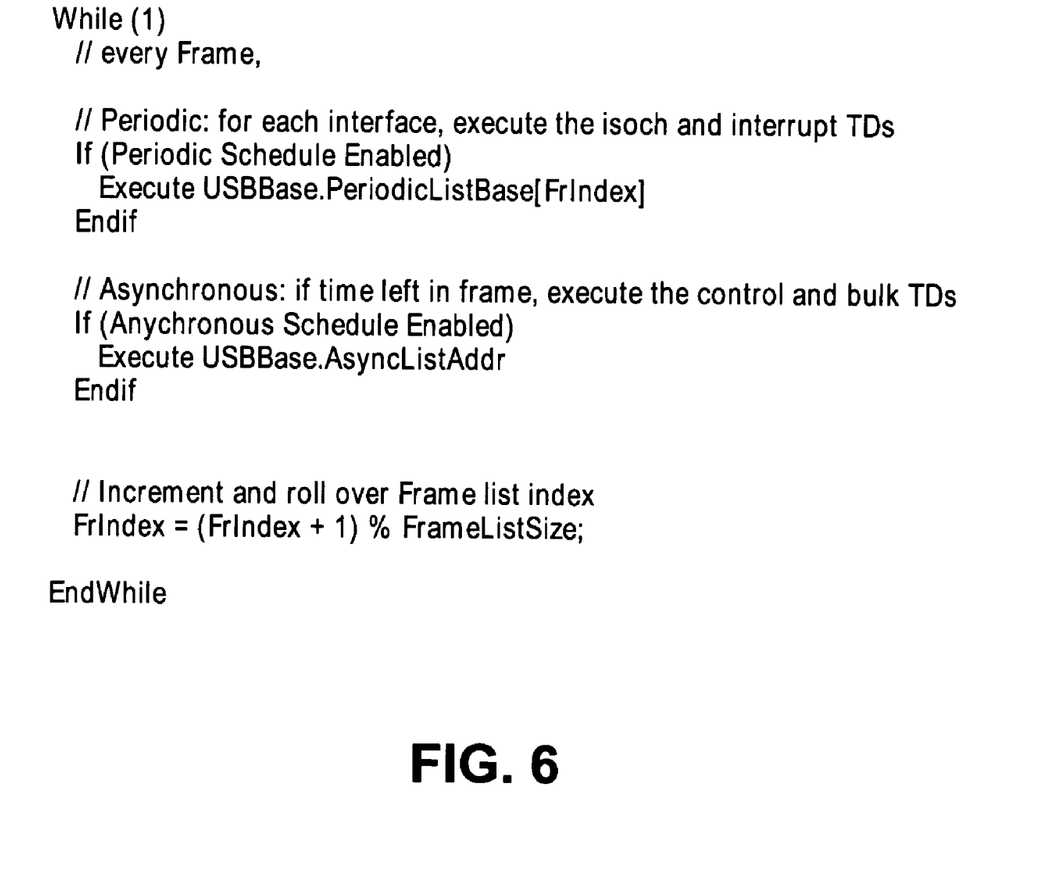
FIG. 6 is software code that describes the EHCI controller actions, and is prior art

FIG. 6 depicts code for traversing a single schedule and depicts the prior art.

Figure 7:
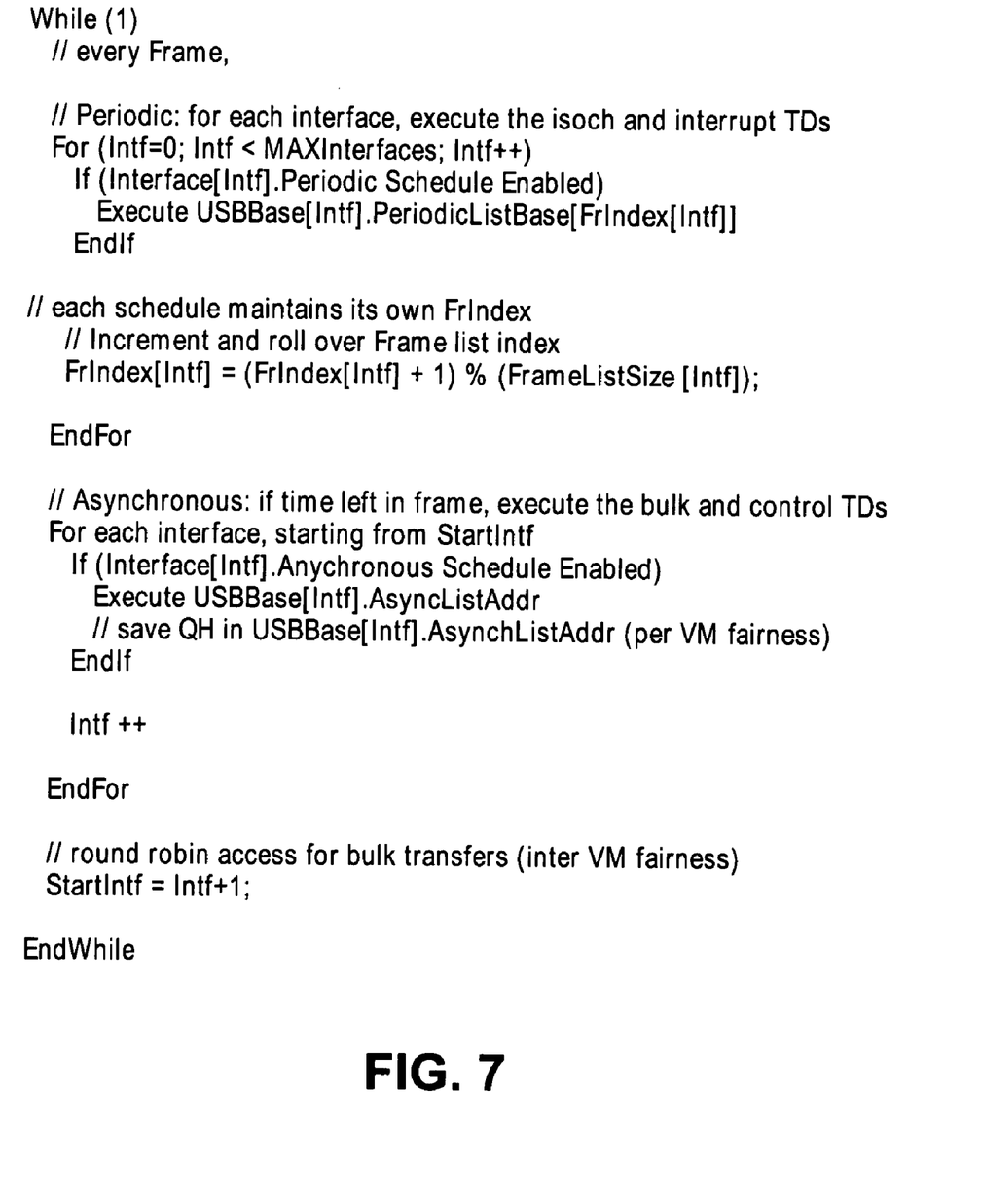
FIG. 7 is software code as utilized by one embodiment of the claimed subject matter. It describes how one embodiment of EHCI controller may service multiple schedules Table 1 is a set of replicated registers as utilized by one embodiment of the claimed subject matter.

FIG. 7 describes an enhanced schedule traversal algorithm, which may be implemented in the host controller according to one embodiment of the present invention. Using this schedule traversal algorithm, the host controller processes the schedules of all the VMs in each frame. In one embodiment, the schedule traversal algorithm includes a fairness policy that prevents starvation of any VM's bulk traffic. Specifically, in each frame the host controller executes the periodic schedules of all the guests, and then it executes the asynchronous schedules of all the guests in a manner that ensures that some progress is made on the scheduled transactions of each guest. In one embodiment, the host controller stores which VM's asynchronous schedule the last executed transaction in the previous frame was from, and then in the next frame, it begins executing with the asynchronous schedule of the next VM.

In an embodiment in which different VMs use different frame list sizes, the host controller ensures that the frame list index value for each interface is rolled over at the correct max size. In addition if the interface's framelist rollover interrupts are enabled, then the host controller generates an interrupt.

TABLE 1

Replicated USBBase registers (for EHCI)

| Offset | Mnemonic | Description | Register Access | Comment |
|---|---|---|---|---|
| 10-13h | USBBASE | Base Address to Memory-mapped Host Controller Register Space | R/W by VM | VMs read and write to this register |
| Offset in the extended configuration space (between FFh and FFFh) | MAXInterfaces | Max Number of interfaces supported | | |
| | NInterfaces | Interfaces configured | | |
| | USBBase[0] | First USBBase | R/W by VMM | Software in VMM redirects USBBASE read write to these registers |
| | ... | | | |
| | USBBase[n] | Nth USBBase | R/W by VMM | |

Table 2 describes a set of operational registers that may be replicated in the host controller, according to one embodiment of the present invention, the host controller has only one interrupt request line (IRQ) available to it.

This interrupt is handled by the VMM. The VMM determines which VM(s) should be interrupted, and passes the interrupt event to those VMs. This is inefficient since it requires VMM intervention on every USB interrupt.

In another embodiment, the host controller is extended so that it can use a range of interrupt request lines. Each interrupt request line is associated with a register interface. When the USB host controller completes a transaction with interrupt on completion bit set, it generates an interrupt request on the interrupt request line associated with the register set that originated the transaction. The interrupt is directed to the proper VM with minimal intervention by the VMM.

Although the claimed subject matter has been described with reference to specific embodiments, this description is not meant to be construed in a limiting sense. Various modifications of the disclosed embodiment, as well as alternative embodiments of the claimed subject matter, will become apparent to persons skilled in the art upon reference to the description of the claimed subject matter. It is contemplated, therefore, that such modifications can be made without departing from the spirit or scope of the claimed subject matter as defined in the appended claims.

The invention claimed is:

1. A system comprising:
 a memory;
 a memory controller to coordinate memory operations of the memory;
 a plurality of virtual machines; and
 a host controller with a set of registers for each one of the plurality of virtual machines and an interrupt request line for each one of the plurality of virtual machines, each of the sets of registers to be assigned by a virtual machine monitor (VMM) for each one of the plurality of virtual machines, each of the register sets including configuration and operational registers, wherein when a virtual machine accesses a register in the host controller, the access is directed to a register within the set of registers assigned to the virtual machine by trapping of the access by the VMM and propagation of the access by the VMM to the register, wherein at least the configuration register is accessible only by the VMM, and the host controller is to execute a periodic schedule for each interface between the host controller and the plurality of virtual machines and an asynchronous schedule after completion of the periodic schedule for all of the interfaces.

2. An apparatus comprising:
 a host controller including a plurality of sets of registers, each of the sets of registers to be assigned by a virtual machine monitor (VMM) for each one of a plurality of virtual machines executing on a system, each of the register sets including configuration and operational registers, wherein when a virtual machine accesses a register in the host controller, the access is directed to a register within the set of registers assigned to the virtual machine by trapping of the access by the VMM and propagation of the access by the VMM to the register, wherein at least the configuration register is accessible only by the VMM, and the host controller is to execute a periodic schedule for each interface between the host controller and the plurality of virtual machines and thereafter execute an asynchronous schedule after completion of the periodic schedule for all of the interfaces.

3. The apparatus of claim 2, wherein the host controller is to process a schedule for each of the plurality of virtual machines in a first frame.

4. The apparatus of claim 3, wherein the host controller is to store an indicator of the virtual machine for which an asynchronous schedule was a last executed transaction of the first frame.

5. The apparatus of claim 4, wherein the host controller is to execute the asynchronous schedule of a virtual machine following the virtual machine corresponding to the stored indicator in a second frame following the first frame.

6. The apparatus of claim 2, further comprising a plurality of interrupt request lines coupled to the host controller, wherein the host controller is to generate an interrupt request on transaction completion on an interrupt request line associated with a register set for the transaction to direct the interrupt request to a virtual machine corresponding to the transaction.

7. A method comprising:
 assigning, using a virtual machine monitor (VMM) executing on a computer system, a set of registers of a host controller of the computer system, the set of registers including configuration and operational registers, for each one of a plurality of virtual machines executing on the computer system;
 trapping an access by a first virtual machine to one of the configuration registers by the VMM, and propagating the access to the set of registers of the host controller corresponding to the first virtual machine; and
 executing a periodic schedule for each interface between the host controller and the plurality of virtual machines, and thereafter executing an asynchronous schedule after completion of the periodic schedule for all of the interfaces.

8. The method of claim 7, further comprising assigning one set of the operational registers to a guest operating system running on the plurality of virtual machines by the VMM.

9. The method of claim 7, further comprising storing an indicator of the virtual machine for which an asynchronous schedule was a last executed transaction of a first frame.

10. The method of claim 9, further comprising executing the asynchronous schedule of a virtual machine following the virtual machine corresponding to the stored indicator in a second frame following the first frame.

11. The method of claim 7, further comprising generating an interrupt request on transaction completion on an interrupt request line associated with a register set for the transaction to direct the interrupt request to a virtual machine corresponding to the transaction, the interrupt request line one of a plurality of interrupt request lines coupled to the host controller.

* * * * *